METAL-ENCLOSED SWITCHGEAR

Filed March 16, 1955 8 Sheets-Sheet 1

Fig.I.

WITNESSES:
E. A. McCloskey

INVENTOR
Roy S. Tusing.
BY [signature]
ATTORNEY

May 26, 1959 R. S. TUSING 2,888,615

METAL-ENCLOSED SWITCHGEAR

Filed March 16, 1955 8 Sheets-Sheet 2

May 26, 1959 R. S. TUSING 2,888,615

METAL-ENCLOSED SWITCHGEAR

Filed March 16, 1955 8 Sheets-Sheet 3

May 26, 1959 R. S. TUSING 2,888,615

METAL-ENCLOSED SWITCHGEAR

Filed March 16, 1955 8 Sheets-Sheet 4

METAL-ENCLOSED SWITCHGEAR

United States Patent Office 2,888,615

Patented May 26, 1959

2,888,615

METAL-ENCLOSED SWITCHGEAR

Roy S. Tusing, Monroeville, Pa., assignor to Westinghouse Electric Corporation, East Pittsburgh, Pa., a corporation of Pennsylvania Application March 16, 1955, Serial No. 494,794

16 Claims. (Cl. 317—103)

My invention relates, generally, to metal-enclosed switchgear, and, more particularly, to switchgear housing units having circuit breakers of the horizontal drawout type disposed therein.

In metal-enclosed switchgear, it is the usual practice to enclose each circuit breaker unit in an individual cell having a hinged door which may be opened to permit the breaker unit to be removed for inspection or replacement. It has also been the practice to provide a mechanical drive-in or levering device for moving the breaker unit between the test and the connected positions in the cell.

An object of my invention is to provide a drive-in or levering device for moving a breaker unit between predetermined positions in the cell which is simple in construction, efficient in operation, and requires a small amount of space in the cell.

Another object of my invention is to provide a levering device which may be mounted toward the rear and the top of the cell, thereby making space available at the front part of the cell for interlocking mechanisms without increasing the width of the cell.

A further object of my invention is to simplify the protective interlocking mechanism for preventing movement of a closed circuit breaker to and from the connected position.

Still another object of my invention is to prevent opening the cell door while the contact members of the circuit breaker are closed.

A still further object of my invention is to provide a combined tripping and blocking lever for holding the trip bar of the circuit breaker in the trip-free position and blocking the circuit breaker from being closed when the levering device is operable for moving the breaker unit to and from the connected position.

Another object of my invention is to prevent the circuit breaker from being closed while the enclosure door is open and the breaker unit is in the connected position.

A further object of my invention is to provide an interlock between two circuit breakers which will permit only one of the breakers to be closed at one time.

Yet another object of my invention is to provide a single device for indicating different positions of the circuit breaker unit in the cell and also whether the contact members of the breaker are closed or open when the breaker unit is in each one of the positions.

Other objects of the invention will be explained fully hereinafter or will be apparent to those skilled in the art.

In accordance with one embodiment of the invention, a breaker unit is moved between predetermined positions in a cell by lever arms which are first moved longitudinally along their fulcrum points to engage the breaker unit and then actuated about their fulcrum points to move the breaker unit. An interlocking lever pivoted on one side of the breaker unit cooperates with the cross bar of the breaker and an interlocking bar movable vertically in the cell to prevent operation of the levering mechanism while the contacts of the breaker are closed. The interlocking bar also prevents opening the door of the cell while the breaker is closed. A door interlocking device prevents closing the breaker while the door is open.

For a better understanding of the nature and objects of the invention, reference may be had to the following detailed description, taken in conjunction with the accompanying drawings, in which.

Figure 1:
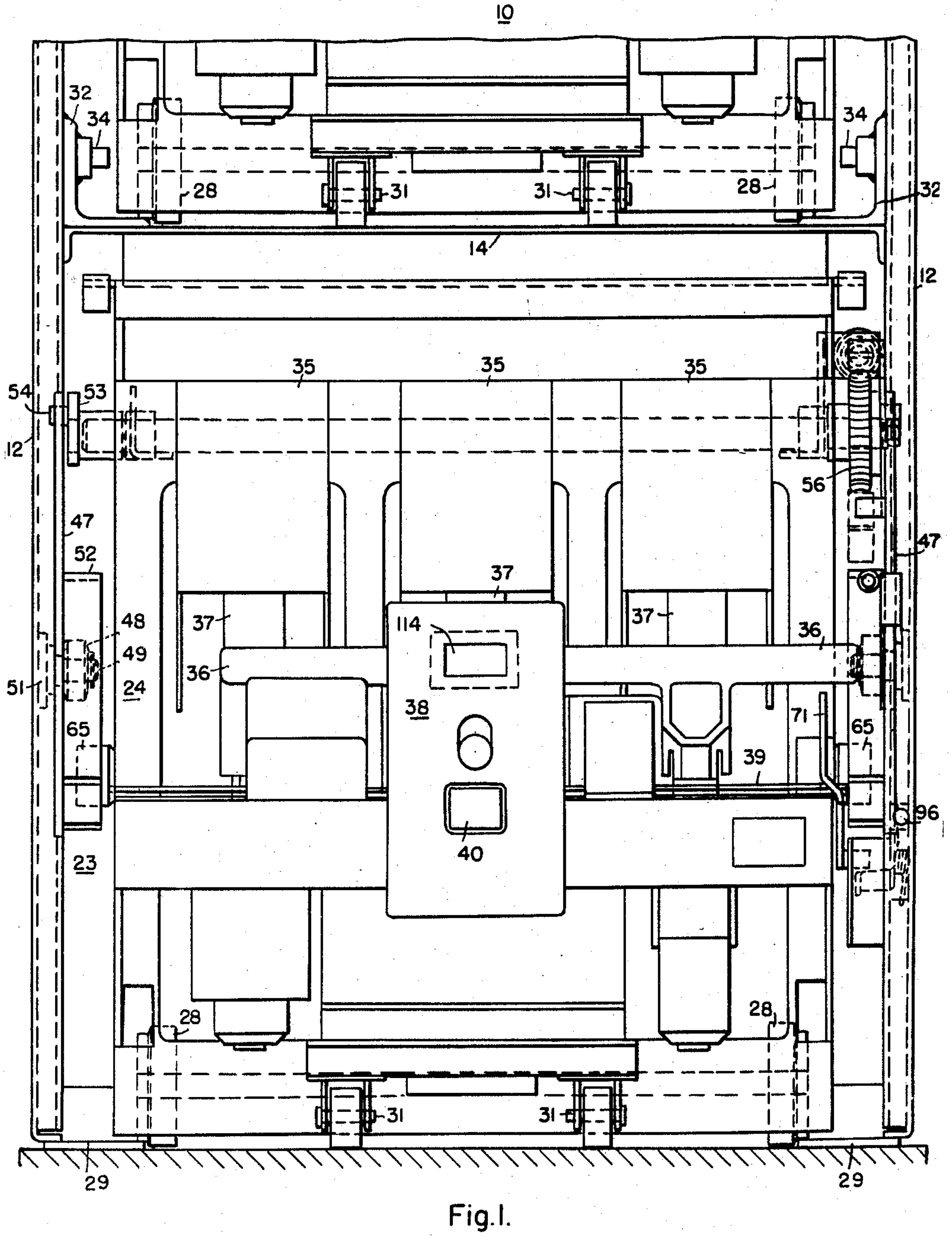
Figure 1 is a view, in front elevation, of a switchgear cell or cubicle structure embodying the principal features of the invention, the door of the cell being removed to show the circuit breaker unit.
Figure 2:
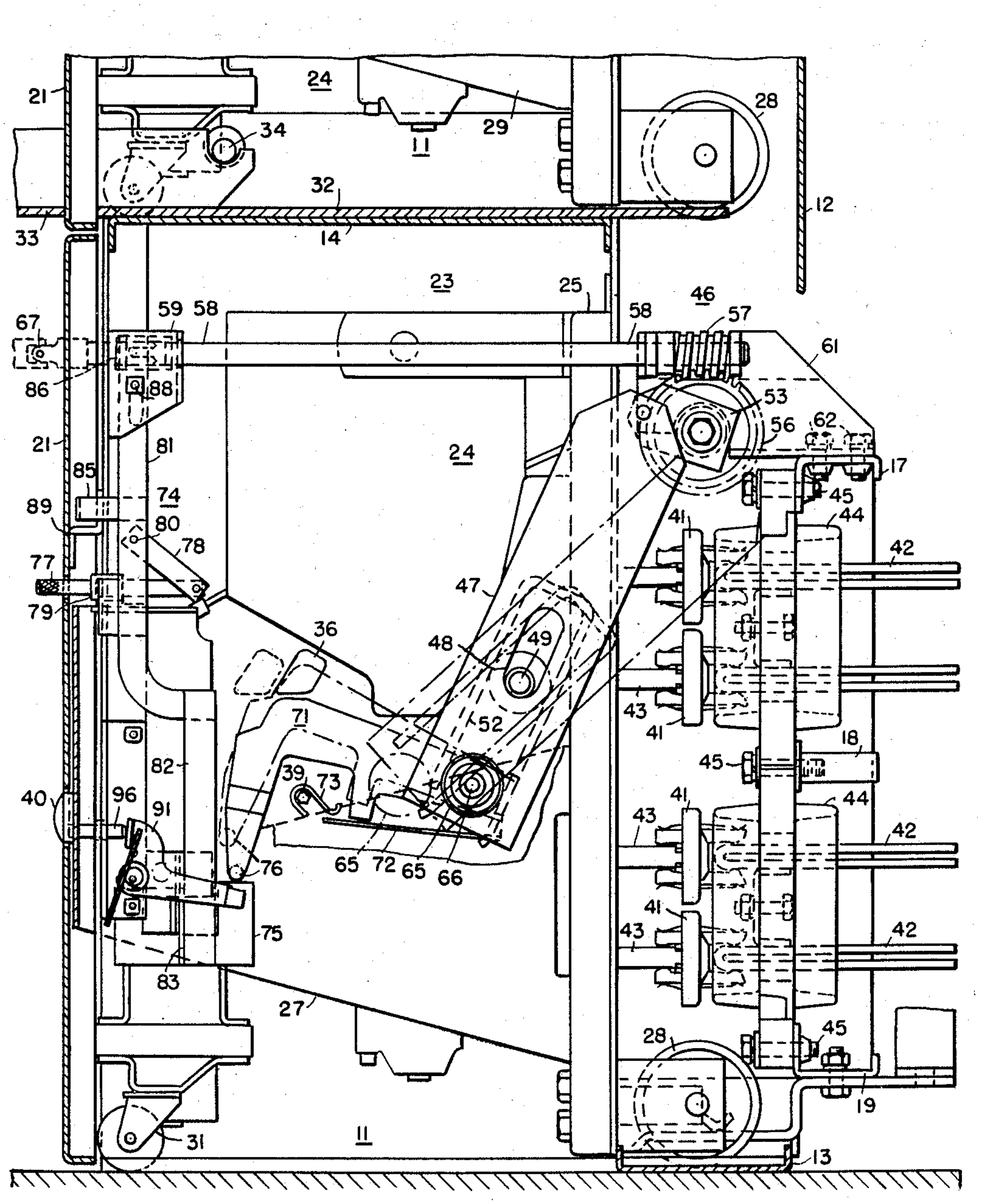
Fig. 2 is a view, partly in side elevation and partly in section, of the structure shown in Fig. 1, the breaker unit being in the connected position.
Figure 3:
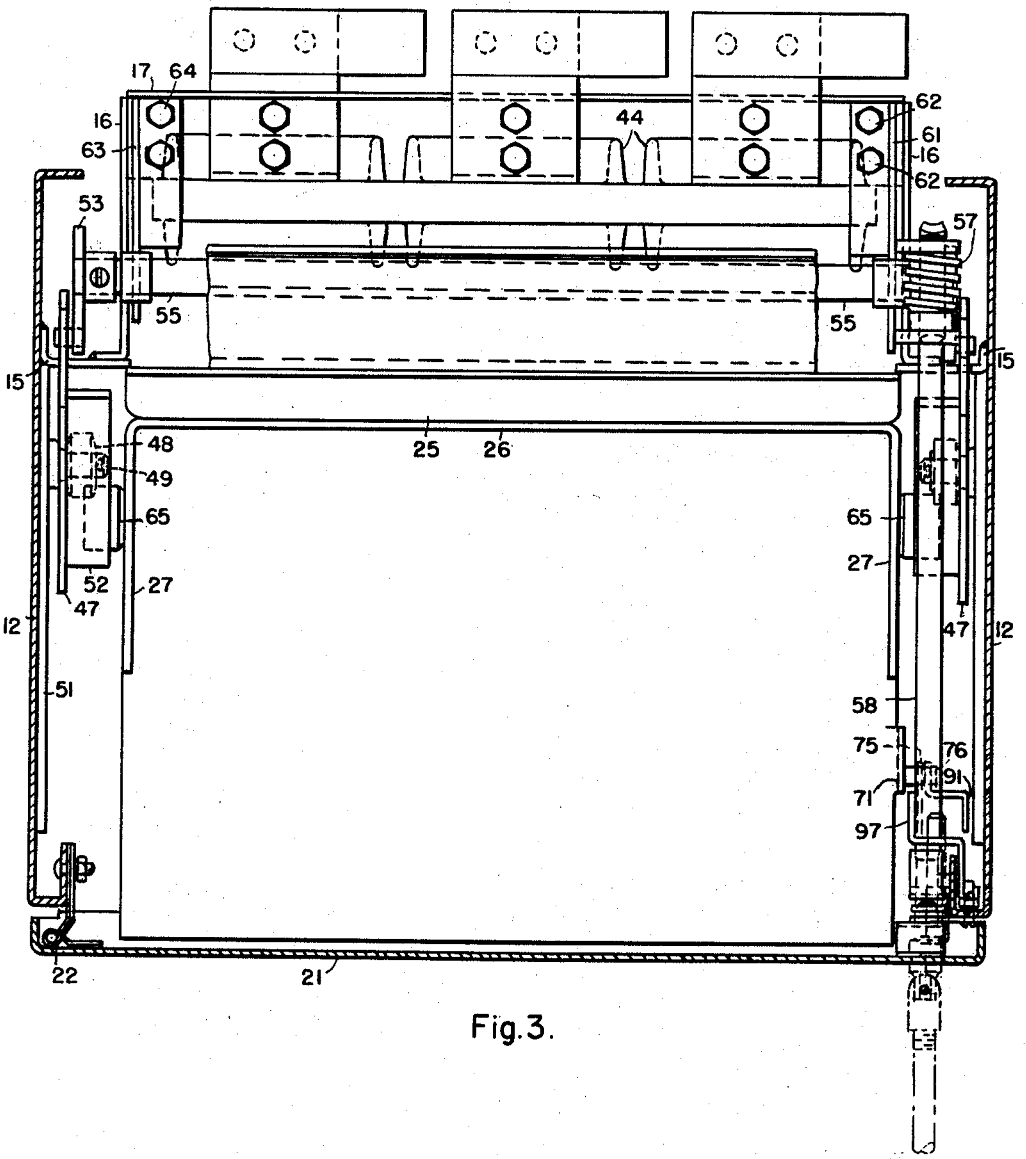
Fig. 3 is a view, partly in plan and partly in section, of the structure shown in Fig. 1, portions of the circuit breaker mechanism being omitted.

Referring to the drawings, and particularly to Figs. 1, 2 and 3, the structure shown therein comprises a switchgear housing or cubicle 10 which may be divided into a plurality of cells or compartments 11. In the present drawings, the bottom cell and a portion of the cell next above the bottom cell are shown. The cubicle 10 comprises flanged side sheets 12, a cross member 13 for tieing the side sheets together at the bottom, cross members 14 which function as barriers between the cells or compartments and also tie the side sheets together, vertically disposed angle members 15 which are welded to the side sheets 12 toward the rear of each cell 11, vertically disposed angle members 16 which are welded to the angle members 15 and extend to the rear of the cell, and horizontally disposed cross members 17, 18 and 19 which extend between the angle members 16 and have their ends welded to these members. Each cell 11 has a door 21 which is hinged to the left hand side sheet 12 by hinges 22, as shown most clearly in Fig. 3.

A circuit breaker unit 23 may be provided in each cell or compartment 11. As shown, the circuit breaker unit 23 is of the horizontal drawout type. It comprises a circuit breaker 24 which is mounted on a drawout carriage comprising a rear panel 25 and a U-shaped member 26 which is attached to the panel 25 and has generally triangular shaped horizontally extending legs 27 which support the circuit breaker mechanism. The carriage is partly supported by rollers 28 which run on rails 29 at the bottom of the cell 11. The carriage is also supported by swivel casters 31 which run on the supporting base for the switchgear housing 10 in the case of the bottom cell 11. In the case of a cell located above the bottom cell, the swivel casters 31 run on the horizontal barrier 14 and the rollers 28 run on angle-shaped rails 32 attached to the side sheets 12 by welding or other suitable means. Extension rails 33 may be provided for the upper cells. As shown in Fig. 2, the inner ends of the extension rails 33 engage pins 34 welded to the angle rails 32.

The circuit breaker 24 is of the three-pole type and has three sets of interrupting contact members (not shown) disposed inside arc chutes 35. The moving contacts of the interrupting contact members are connected to a horizontally disposed cross bar 36 by members 37. The cross bar 36 is actuated by a closing mechanism 38 in a manner well-known in the art to close the interrupting contact members of the circuit breaker. The breaker 24 is of the trip-free type and has a trip bar 39 for releasing the closing mechanism to prevent closing the contact members of the circuit breaker. A push button 40 is provided for manually operating the trip bar.

As shown most clearly in Fig. 2, the circuit breaker unit 23 is provided with primary disconnecting contact members 41 which engage fixed contact members 42 at the rear of the cell when the breaker unit is in the connected position. The primary disconnecting contact members 41 may be of a type well-known in the art and they are mounted on bars 43 which extend from the rear of the panel 25 of the breaker unit 23. The fixed contact members 42 are mounted in insulating members 44 which are attached to the cross members 17, 18 and 19 by bolts 45. The primary disconnecting contacts 41 are disengaged from the fixed contact members 42 when the circuit breaker unit 23 is in the test position.

In order that the circuit breaker unit 23 may be moved within the cell to engage and disengage the primary disconnecting contacts, a drive mechanism 46 is provided for moving the circuit breaker unit from the test to the connected position and vice versa. The drive mechanism comprises a pair of spaced lever arms 47 which are actuated about rollers 48 which function as fulcrums for the lever arms 47. Each roller 48 is mounted on a pin 49 which is attached to a plate 51, which in turn, is attached to a side sheet 12. Each lever arm 47 is provided with a raceway 52 for the roller 48.

The upper end of each lever arm 47 is connected to a crank arm 53 by a pin 54. The crank arms 53 are secured to opposite ends of a horizontal shaft 55. A gear 56 is secured to the shaft 55 and is driven by a worm gear 57. The worm gear 57 is driven by a shaft 58 which is disposed at one side of the cell and extends toward the front of the cell. The front end of the shaft 58 is mounted in a bracket 59 which is attached to one of the side sheets 12. The rear end of the shaft 58 and the one end of the shaft 55 are mounted in a bracket 61 which is attached to the cross member 17 by bolts 62. The other end of the shaft 55 is mounted in a bracket 63 which is also attached to the cross member 17. A roller 65 is mounted on a pin 66 at each side of the circuit breaker unit. As shown most clearly in Fig. 2, the rollers 65 are disposed in the lower ends of the raceways 52 on the lever arms 47 when the breaker unit is in the connected position in the cell.

In order to move the breaker unit from the connected to the test position, as shown by the broken lines in Fig. 2, the shaft 55 is rotated to actuate the lever arms 47 from the position shown by the full lines to the position shown by the broken lines in Fig. 2. As the shaft 55 is rotated, the lever arms are first moved longitudinally along their fulcrums 48 and then actuated about the fulcrums 48 to move the rollers 65 from the position shown by the full lines to the position shown by the broken lines, thereby moving the circuit breaker unit from the connected to the test position. As shown by the broken lines, the rollers 65 are practically disengaged from the raceways 52 when the breaker unit is in the test position. Thus, the unit may be removed from the cell without interference by the raceways 52 on the lever arms 47.

As shown by the broken lines in Fig. 2, the lower end portion of each of the raceways 52 is engaged by a roller 65 when the breaker is moved into the cell to the test position. Thus, further movement of the breaker into the cell is prevented and it is necessary to operate the drive mechanism 46 in order to move the circuit breaker from the test to the connected position. When the shaft 58 is rotated to drive the shaft 55 in the opposite direction from that in which it was driven to move the breaker out of the cell, the lever arms 47 are first moved longitudinally along their fulcrums 48 to cause the raceways 52 to fully engage the rollers 65 on the circuit breaker unit. The lever arms are then actuated about their fulcrum points to move the breaker unit from the test to the connected position. As indicated by the broken lines in Fig. 2, the shaft 58 may be driven by a hand-crank 67 to operate the drive mechanism 46.

As explained hereinbefore, it is necessary to provide protective interlocking to prevent the drive mechanism from being operated when the breaker is closed and to prevent the closing of the breaker if the crank 67 is in position to operate the drive mechanism. As also explained hereinbefore, it is desirable to make the circuit breaker trip-free throughout its range of travel between the test and the connected positions.

As shown most clearly in Fig. 2, an interlocking lever 71 is pivotally mounted at one side of the breaker unit 23 on the pin 66 which supports one of the rollers 65. A leaf spring 72 is attached to the lever 71 and is disposed to engage a finger 73 to rotate the trip bar 39 when the lever 71 is raised about its pivot point 66. As explained hereinbefore, when the trip bar 39 is rotated, the closing mechanism of the breaker is released to make the breaker trip-free.

As shown in Fig. 2, one end of the cross bar 36 is disposed above the interlocking lever 71 to prevent the raising of the lever when the contact members of the circuit breaker are closed. Thus, it is necessary to trip the circuit breaker to open the contact members, thereby causing the cross bar 36 to move to the position shown by the broken lines, before the lever 71 can be raised.

Assuming that the contact members of the circuit breaker are open, an interlocking bar 74 may be actuated to raise the interlocking lever 71. The interlocking bar 74 has a plate 75 attached at its lower end which engages a pin 76 on the interlocking lever 71 to raise the interlocking lever when the bar 74 is raised.

The interlocking bar 74 is slidably mounted at one side of the cell 11 and it may be raised by pulling on a rod 77, one end of which extends through an opening in the door 21. The other end of the rod 77 is attached to the bar 74 by means of a connecting link 78. The link 78 is so connected that the bar 74 is raised as the rod 77 is pulled outwardly and the bar 74 is lowered as the rod 77 is pushed inwardly through a bearing 79 which is attached to one of the side sheets of the cell 11.

As shown most clearly in Figs. 6 to 14, inclusive, the interlocking bar 74 comprises a strip 81 having a curved portion at its lower end, a straight strip 82 which is welded to the lower end of the strip 81, the plate 75 which is attached to the lower end of the strip 82 by a U-shaped member 83, an angle member 84 which is attached to the plate 75 and has its one leg spaced from the U-shaped member 83, an angle member 85 having one leg welded to the strip 81 and another angle-shaped member 86 having one leg welded to the upper end of the strip 81. A generally rectangular slot 87 is provided in the strip 81 to receive a guide pin 88 (see Fig. 2) for guiding the upper end of the bar 74. The lower end of the bar is guided by a means which will be described more fully hereinafter. A pin 80 is provided in the strip 81 for connecting the link 78 to the bar 74 as shown in Fig. 2.

As shown most clearly in Fig. 2, the angle member 85 on the interlocking bar 74 constitutes a hook or latch for engaging one leg of a Z-shaped member 89, which is attached to the door 21. Thus, the door 21 cannot be opened until the interlocking bar 74 is raised to disengage the hook 85 from the member 89. As previously explained, the cross bar 36 engages the interlocking lever 71 to prevent raising the interlocking bar 74 when the contact members of the circuit breaker are closed. Therefore, it is necessary to trip the circuit breaker to cause the contact members of the breaker to open before the door 21 can be opened.

As also shown in Fig. 2, one leg of the angle-member 86 is disposed in front of the end of the shaft 58, thereby preventing the crank 67 from being placed on the shaft 58 to rotate the shaft. Thus, it is necessary to raise the interlocking bar 74 by means of the lifter 77 in order to place the crank 67 on the shaft 58 to operate the drive mechanism. Since, as previously explained, the interlocking bar 74 cannot be raised while the contact members of the breaker are closed, it is necessary to open the contact members before the drive mechanism can be operated to move the breaker from the test to the connected position or vice versa. Therefore, it is impossible to engage or separate the primary disconnecting contact members while the interrupting contact members of the circuit breaker are closed.

Furthermore, it is impossible to close the contact members of the circuit breaker while it is being moved between the test and the connected positions. As previously explained, it is necessary to raise the interlocking lever 71 before the crank 67 can be placed on the shaft 58. As shown by the broken lines in Fig. 2, the cross bar 36 is in front of the interlocking lever 71 when the lever 71 is raised, thereby preventing the contact members of the breaker from being closed since the interlocking lever 71 blocks movement of the cross bar 36 which, as previously explained, must move with the contact members of the circuit breaker.

As previously explained, the spring 72 engages the finger 73 to rotate the trip bar 39 when the interlocking lever 71 is raised. Therefore, the breaker mechanism is trip-free when the interlocking lever 71 is in its uppermost position and the closing mechanism cannot function to close the contact members of the breaker. Accordingly, double protection is provided against closing the contact members of the breaker at an improper time.

As shown in Figs. 2 to 5, inclusive, a spring-biased lever 91 is pivotally mounted at the side of the cell opposite the hinges 22 for the door 21. The lever 91 is mounted on a bearing pin 92 which is secured to a bracket 93 which, in turn, is attached to the flange of a side sheet 12 by means of bolts 94. The lever 91 is biased in a counterclockwise direction, as viewed in Fig. 5, by a spring 95. When the door 21 is closed, a pin 96, which is secured to the door 21, engages the lever 91 to actuate it in a clockwise direction. Thus, when the door is opened, the lever 91 is actuated by the spring 95 to raise the interlocking lever 71. The lever 71 is maintained in its raised position by the lever 91 so long as the door remains open. Therefore, the contact members of the circuit breaker cannot be closed while the door is open and the circuit breaker unit is in the connected position. However, the breaker can be closed when it is in the test position since, as indicated by the broken circle in Fig. 5, the pin 76 is moved to a position in which it is not engaged by the lever 91 when the breaker unit is in the test position.

Figure 4:
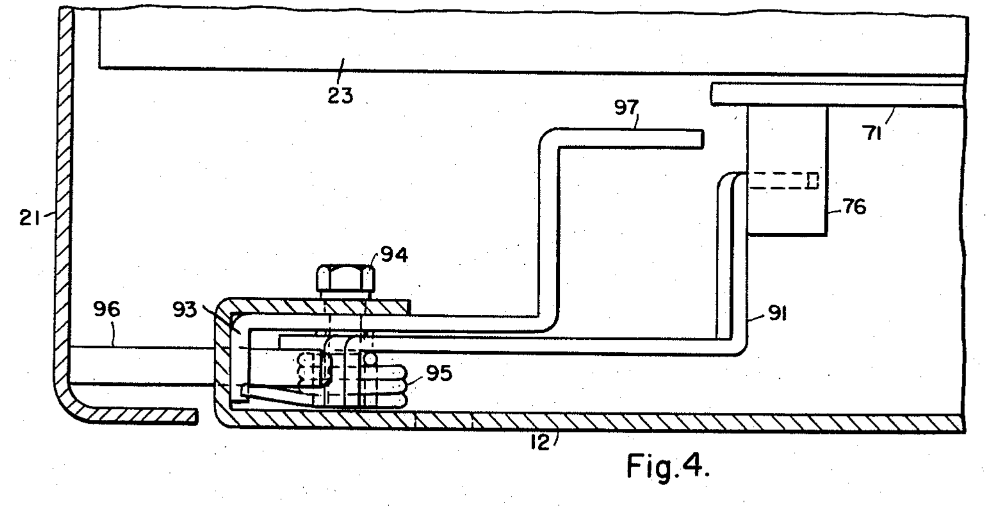
Fig. 4 is an enlarged view, partly in plan and partly in section, of a door interlocking device utilized in the switchgear structure.
Figure 5:
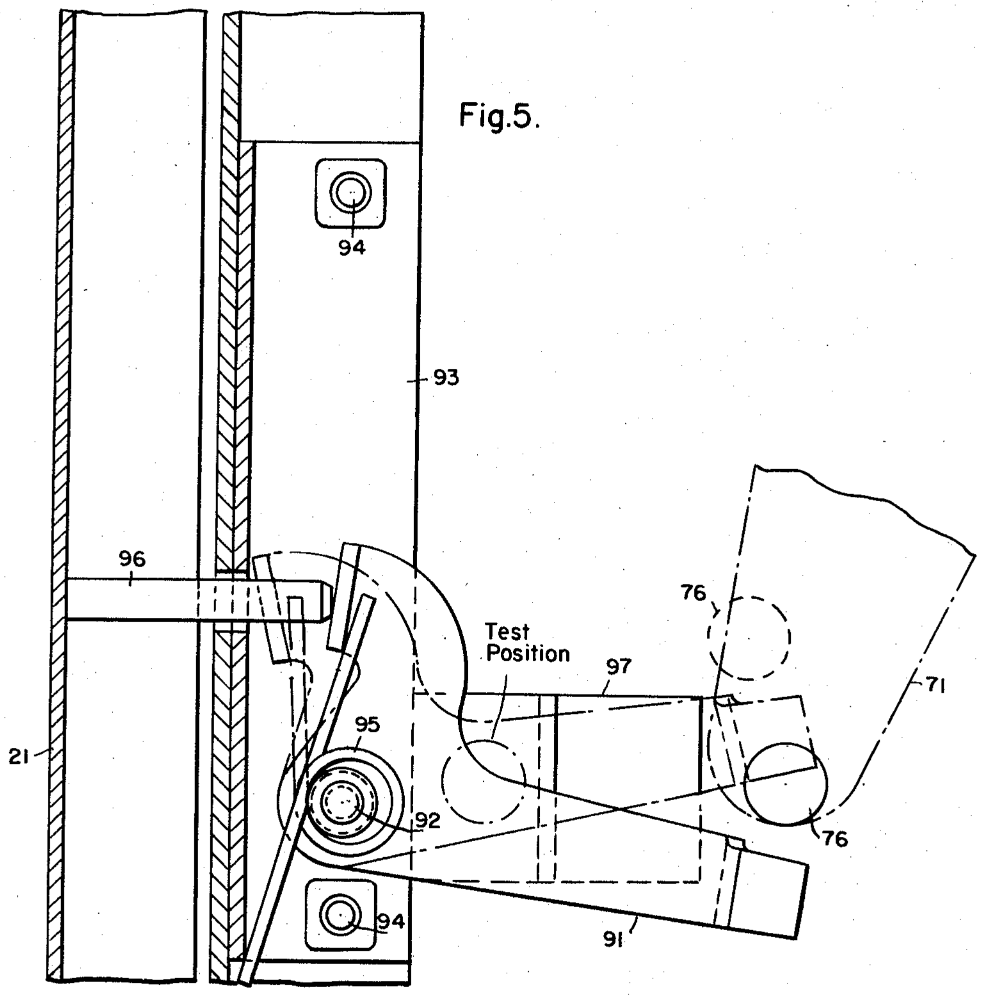
Fig. 5 is an enlarged view, partly in side elevation and partly in section, of the door interlocking device.

Furthermore, the circuit breaker cannot be closed when it is between the test and the connected positions even though the crank 67 is removed from the shaft 58 and the interlocking bar 74 is lowered. As shown in Figs. 4 and 5, the bracket 93 has an arm 97 which is so disposed that it engages the pin 76 on the interlocking lever 71 to prevent the lever from lowering while the breaker unit is at any point between the test and the connected positions.

Since the lever 91 is located at the side of the cell opposite the hinges 22, the lever functions to make it necessary for the door 21 to be fully closed before the lever is actuated to release the interlocking arm, which prevents the closing of the circuit breaker. Prior interlocking devices were located at the same side of the cell as the hinges for the door. Furthermore, the possibility of the breaker unit being left without it being fully inserted into the cell to the connected position is precluded since the interlocking lever 71 is held in its uppermost position by the arm 97 on the bracket 93 until the breaker is moved to the connected position.

The details of the structure of the lever 91 and the bracket 93 are shown in Figures 15 to 23, inclusive. A bearing sleeve 98 is secured to the lever 91 for pivotally supporting the lever 91 on the pin 92 which, as previously explained is secured in the bracket 93. Nuts 99 are attached to the bracket 93 for receiving the threaded ends of the bolts 94 which are utilized to attach the bracket 93 to the flange of the side sheet 12.

Figures 6, 7, 8, 9, 10, 11, 12, 13, 14:
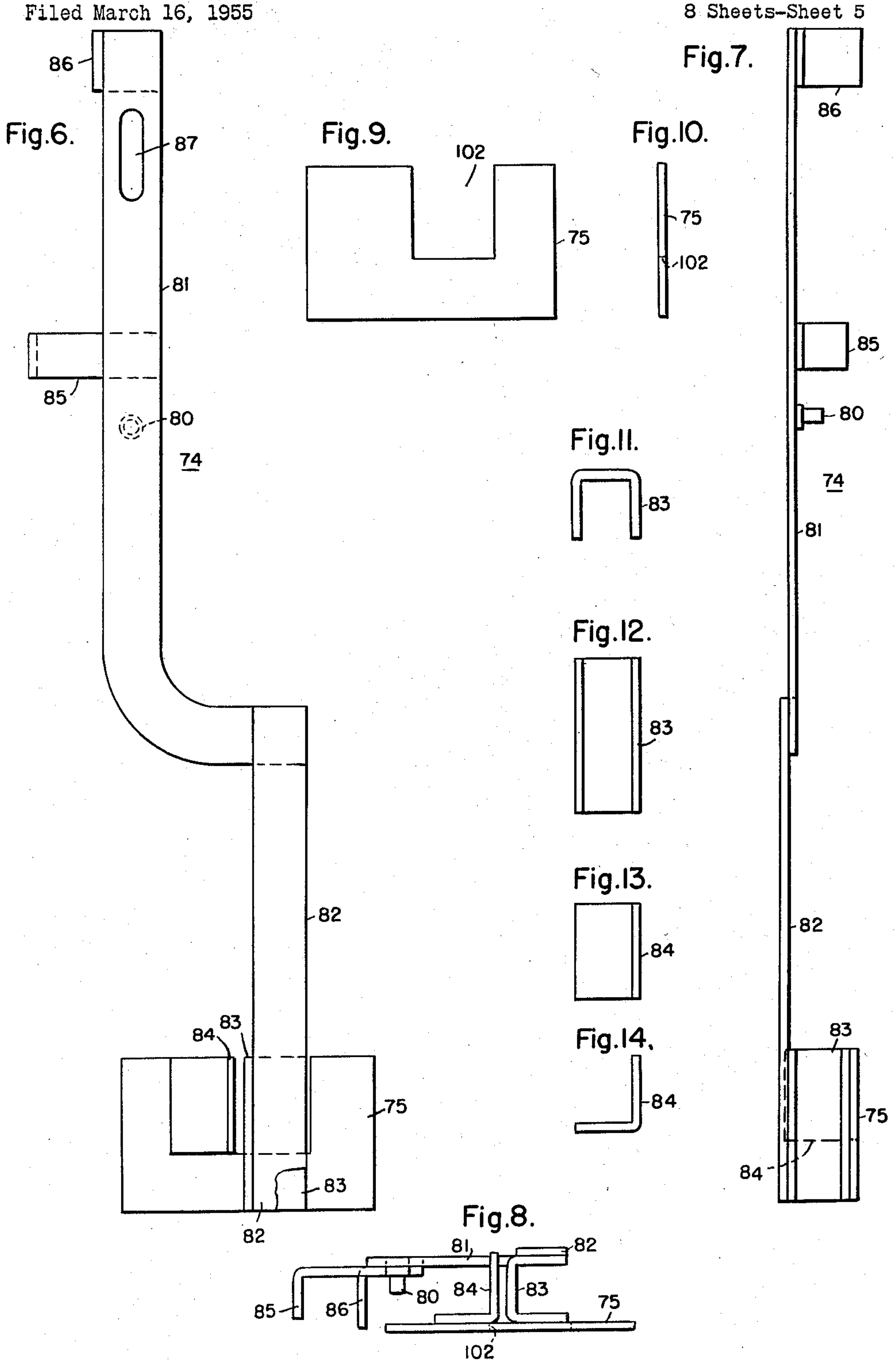
Fig. 6 is an enlarged view, in side elevation, of an interlocking bar utilized on the switchgear structure.
Fig. 7 is an enlarged view, in rear elevation, of the interlocking bar.
Fig. 8 is an enlarged view, in bottom plan, of the interlocking bar.
Figs. 9 and 10 are enlarged views, in side and rear elevation, respectively, of one part of the interlocking bar.
Figs. 11 and 12 are enlarged views, in plan and elevation, respectively, of another part of the interlocking bar.
Figs. 13 and 14 are enlarged views, in elevation and bottom plan, respectively, of still another part of the interlocking bar.
Figure 15:
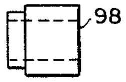
Figs. 15 and 16 are enlarged views, in side and end elevation, respectively, of a bearing sleeve, utilized in the door interlocking device.
Figure 16:
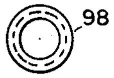
Figure 20:
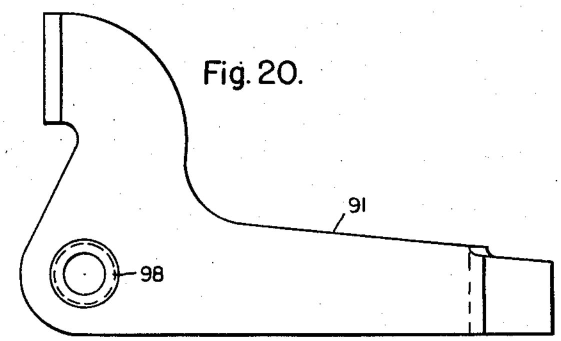
Figs. 19 and 20 are enlarged views, in plan and side elevation, respectively, of a lever utilized in the door interlocking device.
Figures 17, 18, 19, 21:
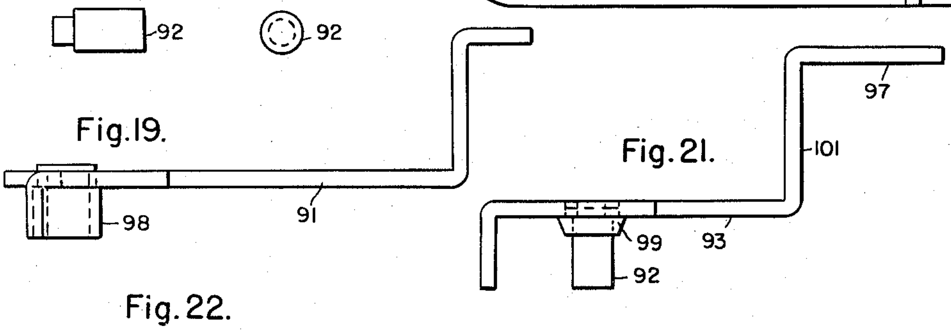
Figs. 17 and 18 are enlarged views, in side and end elevation, respectively, of a bearing pin utilized in the door interlocking device.
Figs. 21, 22 and 23 are enlarged views, in plan, front elevation and side elevation, respectively, of a bracket utilized in connection with the interlocking devices.
Figure 22:
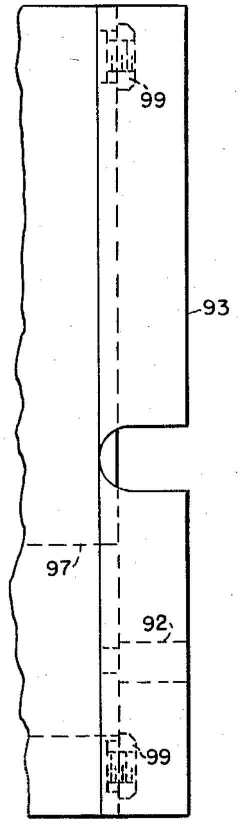
Figure 23:
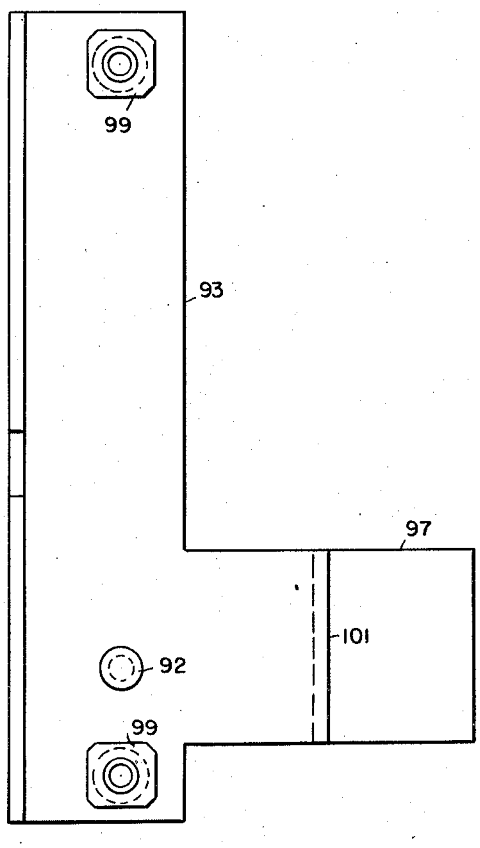

The bracket 93 also functions to guide the lower end of the interlocking bar 74. As previously explained, the U-shaped member 83 and the angle member 84 at the lower end of the bar 74 are spaced to receive a portion 101 of the bracket 93, thereby guiding the movement of the interlocking bar 74. As shown in Fig. 9, the plate 75 has a notch 102 therein which permits the plate 75 to be raised past the portion 101 of the bracket 93.

As previously explained, it is sometimes desirable to so interlock two circuit breakers located in adjoining cells that both breakers cannot be closed simultaneously. This is accomplished by the interlocking scheme shown in Figs. 24 and 25. As shown in the lower portion of Figs. 24 and 25, a bell crank lever 103 is pivotally mounted on a pin 104 which is secured to the side sheet 12. One arm 105 of the lever 103 is disposed to be engaged by the cross bar 36 of the circuit breaker. The other arm 106 of the bell crank lever is connected to a cylindrical tube 107 by means of a rivet 108.

Figures 24, 25:
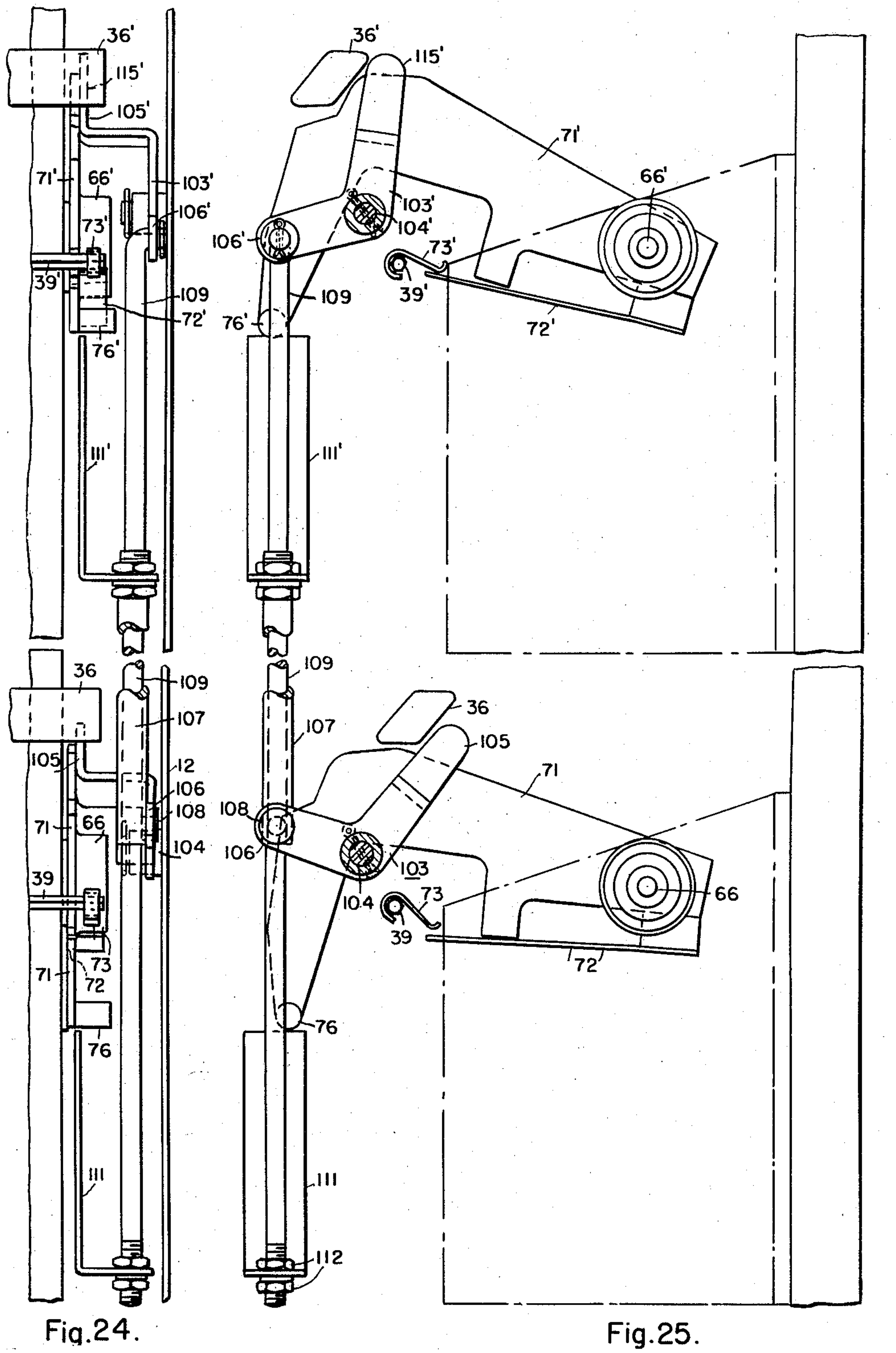
Figs. 24 and 25 are enlarged views, in front and side elevation, respectively, of a device for interlocking two circuit breakers in adjoining cells to prevent both breakers from being closed simultaneously.

As shown in the upper part of Figs. 24 and 25, another lever 103' is similarly mounted at the side of another cell which may be located above the lower cell in the switchgear structure. One arm 105' of the lever 103' is disposed to be engaged by the cross bar 36' of the circuit breaker mounted in the upper cell. The other arm 106' of the lever 104' is connected to the upper end of a rod 109. As shown, the rod 109 passes through the inside of the tube 107 and an angle-shaped member 111 is attached to the lower end of the rod 109 by nuts 112. The upper end of the one leg of the member 111 is disposed to engage the pin 76 on the interlocking lever 71 on the lower breaker. An angle-shaped member 111' is attached to the upper end of the tube 107 and the upper end of the member 111' is disposed to engage the pin 76' of the interlocking lever 71' on the breaker in the upper cell.

As shown, the contact members of the breaker in the lower cell are closed and the bell crank lever 103 has been rotated clockwise by the cross bar 36 on the breaker in the lower cell. The arm 108 has raised the tube 107 and the member 111' to raise the interlocking lever 71' on the upper breaker. As previously explained, the upper breaker cannot be closed while the interlocking lever 71' is in its uppermost position since the cross bar 36' is prevented from moving to the right by the interlocking lever 71'. Thus, it is necessary to open the lower breaker before the upper breaker can be closed.

When the upper breaker is closed, the lever 103' is rotated clockwise by the cross bar 36', thereby raising the rod 109 and the member 111 to raise the interlocking lever 71 on the lower breaker. Thus, the lever 71 prevents the cross bar 36 from moving to close the contact members of the lower breaker.

As an additional protection against closing the wrong circuit breaker, the spring 72 engages the finger 73 to rotate the trip bar 39 to release the closing mechanism to prevent closing the contact members of the circuit breaker. Likewise, the spring 72' rotates the trip bar 39' to release the closing mechanism of the upper circuit breaker. This is an advantage over prior interlocking schemes between two circuit breakers in which the contact members were prevented from being closed simultaneously. Prior schemes provided only one means for preventing the simultaneous closing of the contact members. Furthermore, the present scheme prevents the possibility of the closing mechanism attempting to close the contact members against the pressure of the cross bar engaging the interlocking lever 71.

When a circuit breaker unit is disposed in a cell which is so constructed that the breaker unit may be moved from the connected position to the test position and then to a disconnected position with the door of the cell closed, as is fully described in a copending application Serial No. 223,564, filed by C. P. West, on April 28, 1951, and assigned to the same assignee as the present application, which is now Patent No. 2,777,024, issued January 8, 1957, it is desirable to provide means for indicating the position of the breaker unit in the cell and also to indicate whether the contact members of the circuit breaker are open or closed. This is accomplished by the indicating means shown in Figs. 26 to 28, in which an indicating plate 113 is disposed to be moved vertically inside the cell behind a window 114 provided in the door 21 of the cell. The plate 113 has indicia thereon indicating various positions of the circuit breaker unit in the cell and also indicating whether the contact members of the breaker are closed or open when the breaker unit is in either the connected or the test or the disconnected position.

Figure 26:
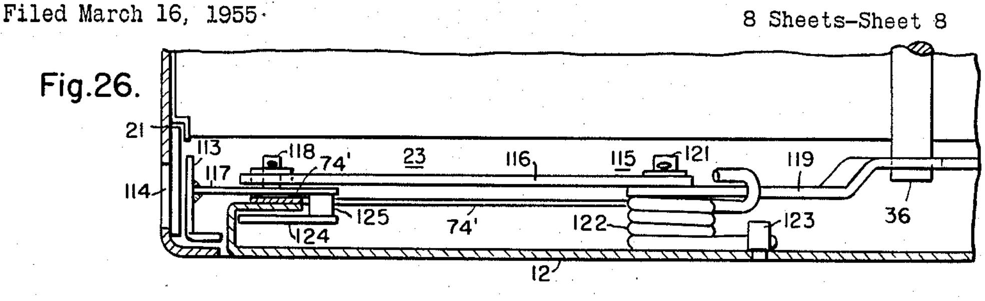
Figs. 26 and 27 are enlarged views, partly in plan and partly in section, and partly in side elevation and partly in section, respectively, of a device for indicating the position of a circuit breaker unit in a cell and the status of the contact members of the circuit breaker.
Figures 27, 28:
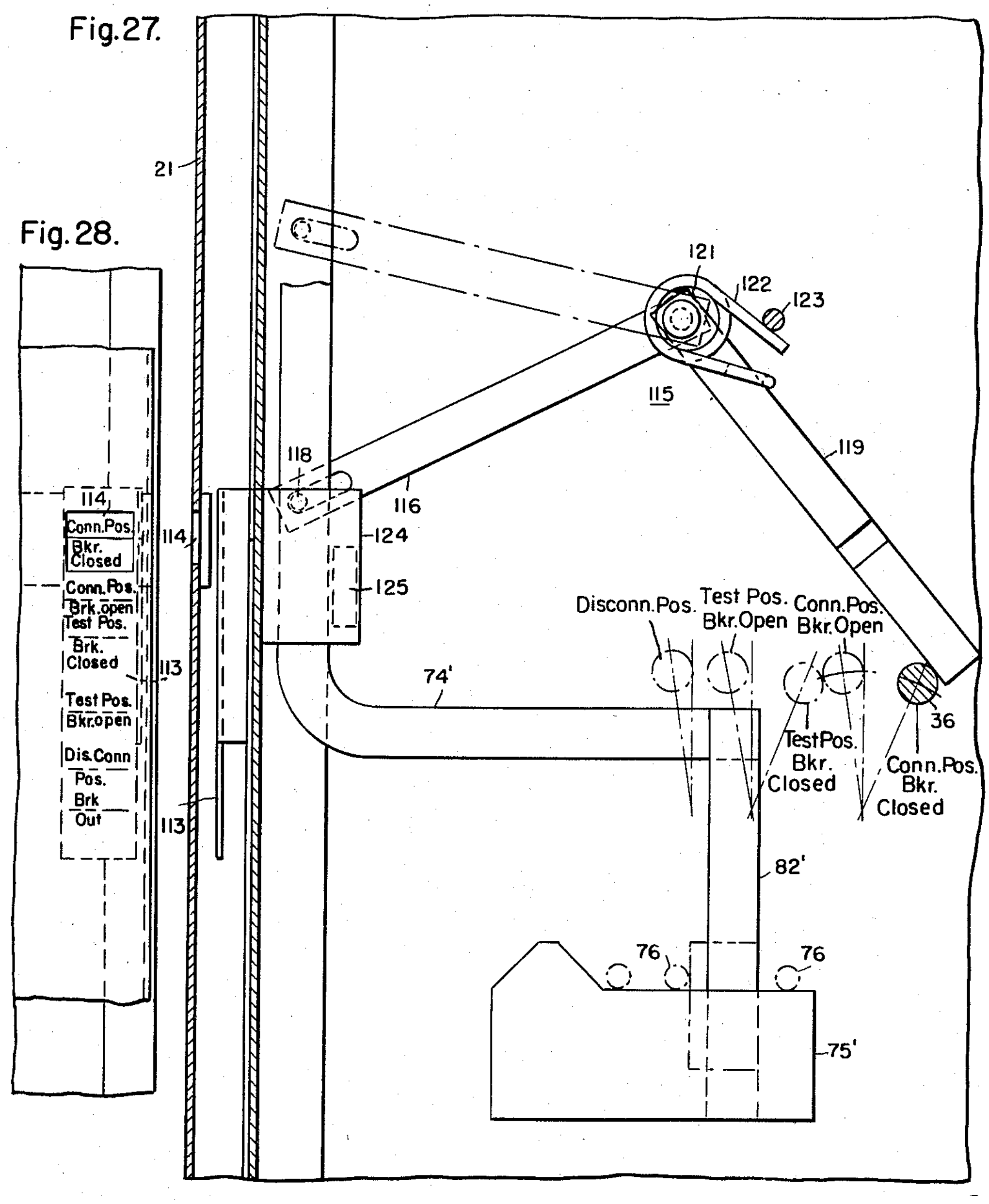
Fig. 28 is a view, in front elevation, of part of the indicating device.

As shown most clearly in Figs. 26 and 27, the plate 113 is actuated by a bell crank lever 115 having one arm 116 which is attached to an extension 117 of the plate 113 by means of a pin 118. Another arm 119 of the bell crank lever 115 is disposed to be engaged by the cross bar 36 of the circuit breaker mounted in the cell. In the present instance, the cross bar 36 is illustrated as being round instead or rectangular as in the other figures of the drawings. The bell crank lever 115 is mounted at one side of the cell on a pin 121 which is attached to the side sheet 12. A spring 122 biases the bell crank lever 115 in a clockwise direction as viewed in Fig. 27. One arm of the spring 122 engages a pin 123 attached to the side sheet 12 and the other arm of the spring 122 engages the arm 119 of the bell crank lever 115.

The movement of the indicating plate 113 is guided by a plate 124 which is attached to the extension 117 by a spacing member 125. As shown, the plate 124 is spaced from the extension 117 to provide space for the flange of the side sheet 12 and the vertical portion of the interlocking bar 74'. Thus, the interlocking bar 74' is permitted to function in its normal manner to control the operation of the drive mechanism for the circuit breaker unit and the closing of the contact members of the circuit breaker by the plate 75' engaging the pin 76 of the interlocking lever 71 on the circuit breaker.

As shown in Figs. 27 and 28, when the circuit breaker unit is in the connected position and the contact members of the circuit breaker are closed, the cross bar 36 actuates the bell crank lever 115 to lower the indicating plate 113 to its lowermost position in which the corresponding indicia appears behind the window 114. When the contact members of the circuit breaker are open with the breaker unit in the connected position, the cross bar 36 moves to a position in which the spring 122 actuates the bell crank lever 115 to raise the indicating plate 113 to cause a corresponding indicia to appear behind the window 114.

Likewise, the cross bar 36 and the spring 122 cooperate to actuate the bell crank lever 115 and move the indicating plate 113 to the proper positions corresponding to the open and closed condition of the contact members of the breaker when the breaker unit is in the test position. Movement of the breaker unit to the disconnected position is also indicated by the indicating plate which is raised by the bell crank lever 115.

Movement of the breaker unit from the disconnected position to the test position and then to the connected position within the cell is indicated in a corresponding manner. Likewise, the open or closed position of the contact members of the circuit breaker is indicated as the breaker is being moved into the cell. As previously explained, the indicating scheme does not interfere with the operation of the interlocking bar 74' and the interlocking lever 71 to control the operation of the drive mechanism in the manner hereinbefore described.

From the foregoing description, it is apparent that I have provided a drive mechanism for moving a circuit breaker unit between predetermined positions within a switchgear cell which is simple in construction and efficient in operation. Furthermore, the drive mechanism is so located above the primary disconnecting contact members of the breaker unit that space is available at the side of the cell for the protective interlocking mechanisms and for a position-indicating device, thereby making it unnecessary to increase the width of the cell in order to accommodate the required interlocking and indicating schemes.

The protective interlocking schemes which I have provided are also simple in structure and efficient in operation. Furthermore, they are foolproof and provide the required interlocking under all conditions of operation. The operation of the trip-free mechanism in conjunction with the mechanical interlocking precludes the possibility of breakage of the mechanical parts of the interlocking mechanisms by one part of the structure opposing the operation of another part. Thus, the satisfactory operation of the interlocking scheme is assured throughout the life of the switchgear structure.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a switchgear structure, in combination, a cell, a circuit breaker unit disposed within the cell and having engageable means thereon, a horizontal shaft rotatably mounted in the cell, actuating means for driving the shaft, crank arms secured to the shaft, lever arms having fulcrum points at the sides of the cell, said lever arms engaging said means on the breaker unit, and said crank arms being connected to said lever arms to move them along their fulcrum points and to actuate them about their fulcrum points to move the breaker unit in the cell.

2. In a switchgear structure, in combination, a cell, a circuit breaker unit disposed within the cell and having engageable means thereon, a horizontal shaft rotatably mounted in the cell, actuating means for driving the shaft, crank arms secured to the shaft, lever arms having fulcrum points at the sides of the cell, said lever arms being moved longitudinally along their fulcrum points to engage said means on the breaker unit, and said crank arms being connected to said lever arms to actuate them about their fulcrum points to move the breaker unit in the cell.

3. In a switchgear structure, in combination, a cell, a circuit breaker unit disposed within the cell and having engageable means thereon, a horizontal shaft rotatably mounted in the cell, actuating means for driving the shaft, crank arms secured to the shaft, lever arms having fulcrum points at the sides of the cell, said crank arms being connected to said lever arms, said lever arms being moved longitudinally along their fulcrum points by said crank arms to engage said means on the breaker unit, and said lever arms being actuated about their fulcrum points by said crank arms to move the breaker unit horizontally in the cell.

4. In a switchgear structure, in combination, a cell, a circuit breaker unit disposed within the cell and having engageable means thereon, a horizontal shaft rotatably mounted in the cell, actuating means for driving the shaft, crank arms secured to the shaft, lever arms having fulcrum points at the sides of the cell, said crank arms being connected to said lever arms, each lever arm having a raceway thereon for receiving the engageable means on the breaker unit, said lever arms being moved longitudinally along their fulcrum points by said crank arms to cause said means to enter said raceways, and said lever arms being actuated about their fulcrum points by said crank arms to move the breaker unit horizontally in the cell.

5. In a switchgear structure, in combination, a cell having fixed contact members at the rear thereof, a circuit breaker unit having primary disconnecting contact members for engaging the fixed contact members in the cell, a horizontal shaft rotatably mounted in the cell above the fixed contact members, actuating means for driving the shaft, lever arms movably mounted on fulcrums at the side of the cell, crank arms secured to the shaft and attached to said lever arms, said lever arms being moved longitudinally by the crank arms to engage the breaker unit, and said crank arms actuating said lever arms about their fulcrum points to move the breaker unit in the cell.

6. In a switchgear structure, in combination, a cell having a door, a circuit breaker unit disposed within the cell and having interrupting contact members thereon, a drive mechanism for moving the breaker unit between predetermined positions within the cell, an interlocking bar slidably disposed within the cell to prevent opening the door when said contact members of the circuit breaker are closed, said bar being operable from outside the cell to release the door when said contact members of the circuit breakers are opened, and blocking means on said bar preventing access to the drive mechanism when the contact members of the circuit breaker are closed.

7. In a switchgear structure, in combination, a cell having a door, a circuit breaker unit disposed within the cell and having interrupting contact members thereon, a drive mechanism for moving the breaker unit between predetermined positions within the cell, an interlocking bar slidably disposed within the cell to prevent opening the door when said contact members of the circuit breaker are closed, actuating means accessible from outside the cell for operating the interlocking bar to release the door when said contact members of the circuit breaker are opened, and blocking means on said interlocking bar preventing access to the drive mechanism when the contact members of the circuit breaker are closed.

8. In a switchgear structure, in combination, a cell having a door, a circuit breaker unit disposed within the cell and having interrupting contact members thereon, a drive mechanism for moving the breaker unit between predetermined positions within the cell, an interlocking bar slidably disposed within the cell to prevent opening the door, when said contact members of the circuit breaker are closed, said bar being operable from outside the cell to release the door, when said contact members of the circuit breaker are opened, an interlocking lever pivotally mounted on the circuit breaker unit, a cross bar movable with the contact members of the circuit breaker, said interlocking lever and said cross bar cooperating with said interlocking bar to prevent opening the door when the contact members of the circuit breaker are closed.

9. In a switchgear structure, in combination, a cell having a door, a circuit breaker unit disposed within the cell and having interrupting contact members thereon, a drive mechanism for moving the breaker unit between predetermined positions within the cell, an interlocking bar slidably disposed within the cell to prevent opening the door when said contact members of the circuit breaker are closed, said bar being operable from outside the cell to release the door when said contact members of the circuit breaker are opened, an interlocking lever pivotally mounted on the circuit breaker unit, a cross bar movable with the contact members of the circuit breaker, said interlocking lever and said cross bar cooperating with said interlocking bar to prevent access to the drive mechanism when the contact members of the circuit breaker are closed.

10. In a switchgear structure, in combination, a cell having a door, a circuit breaker unit disposed within the cell and having interrupting contact members thereon, a drive mechanism for moving the breaker unit between predetermined positions within the cell, an interlocking bar slidably disposed within the cell to prevent opening the door when said contact members of the circuit breaker are closed, said bar being operable from outside the cell to release the door when said contact members of the circuit breaker are opened, an interlocking lever pivotally mounted on the circuit breaker unit, a cross bar movable with the contact members of the circuit breaker, said interlocking lever and said cross bar cooperating with said interlocking bar to prevent closing the contact members of the circuit breaker while the drive mechanism is being operated.

11. In a switchgear structure, in combination, a cell having a door, a circuit breaker unit movable from a test position to a connected position within the cell and vice versa, interrupting contact members on the circuit breaker, a cross bar actuated with the contact members on the circuit breaker when they are opened and closed, an interlocking lever pivotally mounted on the circuit breaker unit, a spring-biased lever mounted in the cell, actuating means on the door for actuating said spring-biased lever, said spring-biased lever cooperating with said interlocking lever and said cross bar to mechanically prevent the closing of the contact members of the breaker while the door is open and the breaker unit is in the connected position in the cell.

12. In a switchgear structure, in combination, a cell having a hinged door, a circuit breaker unit movable from a test position to a connected position within the cell and vice versa, interrupting contact members on the circuit breaker, a cross bar movable with the contact members when they are opened and closed, a mechanism for closing the contact members of the breaker, a trip bar for releasing the breaker closing mechanism, an interlocking lever pivotally mounted on the circuit breaker unit, a spring-biased lever mounted in the cell at the side opposite the hinges for the door, said spring-biased lever cooperating with said interlocking lever to actuate the trip bar to prevent the closing mechanism from closing the breaker contact members while the door is open and the breaker unit is in the connected position, said interlocking lever also cooperating with the cross bar to mechanically prevent manually closing the breaker contact members while the door is open and the breaker unit is in the connected position, and means on the door for actuating the spring-biased lever to permit closing the breaker contact members while the door is closed.

13. In a switchgear structure, in combination, a first cell and a second cell, a circuit breaker unit disposed in each cell, each circuit breaker having interrupting contact members thereon, a cross bar actuated with the contact members of each breaker when they are opened and closed, an interlocking lever pivotally mounted on each circuit breaker unit and disposed to engage the cross bar on its breaker, an actuating lever pivotally mounted in each cell and disposed to be engaged by the cross bar in the same cell, a first member connected to the actuating lever in the first cell and disposed to engage the interlocking lever in the second cell, a second member connected to the actuating lever in the second cell and disposed to engage the interlocking lever in the first cell, the cross bar on the second breaker engaging the actuating lever in the second cell to actuate the interlocking lever in the first cell to engage the cross bar on the first breaker to prevent closing the first breaker while the second breaker is closed, and the cross bar on the first breaker engaging the actuating lever in the first cell to actuate the interlocking lever in the second cell to engage the cross bar on the second breaker to prevent closing the second breaker while the first breaker is closed.

14. In a switchgear structure, in combination, a first cell and a second cell, a circuit breaker unit disposed in each cell, each circuit breaker having interrupting contact members thereon, a cross bar actuated with the contact members of each breaker when they are opened and closed, an interlocking lever pivotally mounted on each circuit breaker unit and disposed to engage the cross bar on its breaker, a trip bar for each breaker, a bell crank lever in each cell, each bell crank lever having one arm disposed to be engaged by the cross bar in the same cell, a first member connected to the other arm of the bell crank lever in the first cell and disposed to engage the interlocking lever in the second cell, a second member connected to the other arm of the bell crank lever in the second cell and disposed to engage the interlocking lever in the first cell, the cross bar on the second breaker engaging the bell crank lever in the second cell to actuate interlocking lever on the first breaker to engage the trip bar and the cross bar on the first breaker to prevent closing the first breaker while the second breaker is closed, and the cross bar on the first breaker engaging the bell crank lever in the first cell to actuate the interlocking lever in the second cell to engage the trip bar and the cross bar on the second breaker to prevent closing the second breaker while the first breaker is closed.

15. In a switchgear structure, in combination, a cell, a circuit breaker unit movable between predetermined positions within the cell and having interrupting contact members on the circuit breaker, a cross bar actuated with the contact members of the circuit breaker when they are opened and closed, said cross bar being movable with the circuit breaker unit, an indicating plate at the front of the cell, a bell crank lever pivotally mounted on a fixed pivot point in the cell, said lever having one arm engaged by the cross bar and the other arm attached to said indicating plate to move the plate in a plane perpendicular to the plane in which the breaker unit is moved, and a spring for biasing the bell crank lever in one direction, said cross bar actuating the lever in the opposite direction.

16. In a switchgear structure, in combination, a cell, a circuit breaker unit movable between predetermined positions within the cell and having interrupting contact members on the circuit breaker, means on the circuit breaker actuated with the contact members of the circuit breaker when they are opened and closed, said means being movable with the circuit breaker unit, an indicating plate at the front of the cell, said plate having indicia thereon indicating a plurality of different positions of the breaker unit in the cell and whether the contact members are opened or closed when the breaker unit is in each one of said positions in the cell, and actuating means movable about a fixed point in the cell and engaged by said means on the circuit breaker for actuating said plate.

References Cited in the file of this patent

UNITED STATES PATENTS

| | | |
|---|---|---|
| 1,885,365 | MacNeil | Nov. 1, 1932 |
| 2,363,364 | Rugg | Nov. 21, 1944 |
| 2,538,042 | Reilly | Jan. 16, 1951 |
| 2,554,510 | Spicer | May 29, 1951 |
| 2,600,304 | Krida | June 10, 1952 |
| 2,673,260 | Lester | Mar. 23, 1954 |
| 2,691,713 | Astin | Oct. 12, 1954 |